UNITED STATES PATENT OFFICE.

JOSEPH L. TURNER, OF PHILADELPHIA, PENNSYLVANIA, ASSIGNOR TO THE H. K. MULFORD COMPANY, OF PHILADELPHIA, PENNSYLVANIA, A CORPORATION OF PENNSYLVANIA.

PROCESS OF PREPARING COLLOIDAL SILVER OXID.

1,043,646.          Specification of Letters Patent.          Patented Nov. 5, 1912.

No Drawing.          Application filed June 8, 1910. Serial No. 565,785.

*To all whom it may concern:*

Be it known that I, JOSEPH L. TURNER, a subject of the Czar of Russia, residing in Philadelphia, county of Philadelphia, State of Pennsylvania, have invented certain Improvements in Processes of Preparing Colloidal Silver Oxid, of which the following is a specification.

One object of my invention is to provide a thoroughly practical process for commercially manufacturing silver oxid in colloidal form so that it shall be easily soluble in water or glycerin and shall exhibit the properties characterizing all colloidal substances.

In carrying out my invention I first dissolve casein or any other proteid in a solution of sodium carbonate and to this add a solution of silver nitrate. There is thus formed a precipitate which after being collected and washed, is pressed to free it of the greater part of the adhering liquid. It is then dissolved in a solution of ammonium hydroxid to which is added an ammoniacal solution of silver nitrate and then a solution of a fixed alkali such as potassium hydroxid. This combined solution is maintained at a temperature between 50° and 70° C. for a suitable period of time, with the result that the ammoniacal silver oxid assumes the colloidal form. After the re-action is completed, the resulting liquid is dialyzed against water to free it from organic and inorganic crystalloid substances.

If desired, instead of at once dialyzing the product as above indicated, the product of the re-action may be precipitated with an acid such as acetic or sulfuric, the resulting precipitate washed several times with water, then re-dissolved in a solution of a fixed alkali, and finally dialyzed against water to free it from the excess of alkali.

As a typical example of the proportions which may be employed in carrying out my invention, I place in a suitable vessel thirty eight (38) pounds of casein dissolved in fifty (50) gallons of water with the aid of two (2) pounds of sodium carbonate. A solution of forty eight (48) ounces of silver nitrate in water is then added and after the re-action is completed, the resulting precipitate which consists of silver caseinate is filtered off, thoroughly washed with water, and pressed to the desired degree of dryness. It is then placed in a suitable vessel with twelve (12) gallons of water and four (4) gallons of ammonium hydroxid of 28% strength. Heat is then applied until a solution results, after which said solution is cooled and to it are added a solution of thirty three (33) pounds of silver nitrate in a mixture of four (4) gallons of ammonium hydroxid of 28% strength and four (4) gallons of water, and then a solution of sixteen (16) pounds eight (8) ounces of potassium hydroxid in five (5) gallons of water. The solution is stirred while being gradually brought to a temperature of 60° C., at which point it is kept for about five (5) hours under constant stirring, when the re-action is completed and the product, after being allowed to stand for about twelve (12) hours, is precipitated by a weak solution of sulfuric acid; it being assumed that the precipitation is complete when the re-action of the liquid becomes slightly acid to litmus. The precipitate is next washed with water to remove all the soluble matter such as ammonium hydroxid, potassium hydroxid, excess of ammoniacal silver oxid, etc., and is finally dissolved in a solution of five (5) pounds of potassium hydroxid in eight (8) gallons of water, after which it is dialyzed against water to completely free it from the excess of alkali. The resulting liquid may either be used as such, or may be evaporated to dryness at a low temperature, preferably *in vacuo*. If treated in this latter manner, the dry product appears in the form of black scales with a metallic luster, containing about fifty per cent. (50%) of silver. These scales are easily soluble in water and glycerin and their solutions exhibit the properties peculiar to all colloidal substances; it being understood that my product is a colloidal silver oxid combined with such an amount of protective colloid derived from a silver caseinate as may be found necessary for practical purposes. The product containing 50% of silver exhibits black scales of a metallic luster which diminishes or increases in direct proportion to the silver content. It is soluble in water in all proportions forming colloidal solutions which exhibit all properties common to colloidal substances in regard to electro-conductivity, reflection of light, behavior under ultra-microscope, etc. These solutions are greenish black and opalescent in reflected light and reddish brown and clear in transmitted light. They are precipitated on addition of acids and such substances which are known as precipitates for colloidal solutions, such as concentrated solutions of sodium chlorid, ammonium sulfate, magnesium sulfate, sodium sulfate, zinc sulfate, etc. More commonly stated, a concentrated solution of any electrolyte will precipitate solutions of colloidal silver oxid.

It is to be understood that I do not limit myself to the specific proportions of the ingredients noted above, as it is obvious that these may be widely varied without departing from the main features of my invention, and while, as above noted, the product resulting from my process preferably contains about 50% of silver, this latter may also be subject to considerable variation.

While I have referred to casein as one of the ingredients which may be employed, it is to be understood that egg albumen or any other proteid is the equivalent of and may be substituted for, such casein.

I claim:—

1. The process of producing silver oxid in colloidal form which consists in acting on a silver-proteid compound in the presence of a fixed alkali with a solution of a silver salt, and thereafter separating out the silver compound.

2. The process which consists in acting on a proteid with a silver salt; subjecting a solution of the precipitate formed to the action of a solution of a silver salt and a solution of a fixed alkali; precipitating the resulting solution by an acid; and treating a solution of said precipitate to obtain colloidal silver oxid.

3. The process which consists in acting on a proteid with silver nitrate; subjecting a solution of the resulting precipitate to the combined action of silver nitrate and a fixed alkali; heating the solution; precipitating the same by an acid; dissolving the precipitate in a solution of a fixed alkali; and treating the final solution to obtain colloidal silver oxid.

4. The process which consists in acting on a proteid with a solution of silver nitrate; dissolving the resulting precipitate in ammonium hydroxid; subjecting said solution to the action of an ammoniacal solution of silver nitrate and a solution of potassium hydroxid; precipitating the resulting solution with an acid; dissolving the precipitate formed in potassium hydroxid; and treating the final solution to obtain colloidal silver oxid.

5. The process which consists in adding forty-eight (48) ounces of nitrate of silver to a solution of thirty eight (38) pounds of a proteid in fifty (50) gallons of water containing two (2) pounds of sodium carbonate; dissolving the resulting precipitate in twelve (12) gallons of water and four (4) gallons of ammonium hydroxid; adding to the same thirty three (33) pounds of nitrate of silver in four (4) gallons of ammonium hydroxid and four (4) gallons of water, with about sixteen (16) pounds of potassium hydroxid in five gallons of water; heating the resulting mixture to a temperature of about 60° C.; precipitating the solution with an acid; dissolving the precipitate in a solution containing eight (8) gallons of water and five (5) pounds of potassium hydroxid; and dialyzing the final solution to obtain colloidal silver oxid.

In testimony whereof, I have signed my name to this specification, in the presence of two subscribing witnesses.

JOSEPH L. TURNER.

Witnesses:
WILLIAM E. BRADLEY,
WM. A. BARR.